(12) United States Patent
Seymour et al.

(10) Patent No.: US 9,170,592 B2
(45) Date of Patent: Oct. 27, 2015

(54) FULLY INTEGRATED VOLTAGE REGULATOR USING OPEN LOOP DIGITAL CONTROL FOR OPTIMUM POWER STEPPING AND SLEW RATE

(75) Inventors: Michael Seymour, Colorado Springs, CO (US); Daniel J. Russell, Monument, CO (US)

(73) Assignee: Atmel Corporation, San Jose, CA (US)

( * ) Notice: Subject to any disclaimer, the term of this patent is extended or adjusted under 35 U.S.C. 154(b) by 68 days.

(21) Appl. No.: 13/603,993

(22) Filed: Sep. 5, 2012

(65) Prior Publication Data

US 2014/0062442 A1    Mar. 6, 2014

(51) Int. Cl.
| | | |
|---|---|---|
| G06F 1/00 | (2006.01) | |
| G05F 1/00 | (2006.01) | |
| G05F 1/565 | (2006.01) | |
| G06F 1/26 | (2006.01) | |
| G06F 1/28 | (2006.01) | |
| G06F 1/30 | (2006.01) | |

(52) U.S. Cl.
CPC ...... *G05F 1/565* (2013.01); *G06F 1/26* (2013.01); *G06F 1/28* (2013.01); *G06F 1/30* (2013.01)

(58) Field of Classification Search
USPC ......... 323/241, 283, 322, 268, 269, 271, 272; 363/21.05, 21.13; 713/300, 310, 330, 713/340
See application file for complete search history.

(56) References Cited

U.S. PATENT DOCUMENTS

| | | | | |
|---|---|---|---|---|
| 4,779,037 | A * | 10/1988 | LoCascio | 323/275 |
| 5,744,944 | A * | 4/1998 | Danstrom | 323/284 |
| 6,721,893 | B1 * | 4/2004 | Tressler et al. | 713/300 |
| 6,785,829 | B1 * | 8/2004 | George et al. | 713/320 |
| RE38,891 | E * | 11/2005 | Danstrom | 713/300 |
| 7,385,377 | B2 * | 6/2008 | Pisasale et al. | 323/267 |
| 7,602,166 | B1 * | 10/2009 | Kang | 323/283 |
| 7,852,053 | B2 * | 12/2010 | Martin et al. | 323/272 |
| 8,575,902 | B1 * | 11/2013 | Wei et al. | 323/269 |
| 2009/0039842 | A1 * | 2/2009 | Chen et al. | 323/272 |
| 2010/0001704 | A1 * | 1/2010 | Williams | 323/283 |
| 2010/0005328 | A1 * | 1/2010 | Rakshani et al. | 713/322 |
| 2010/0277003 | A1 * | 11/2010 | Von Novak et al. | 307/104 |
| 2011/0018516 | A1 * | 1/2011 | Notman et al. | 323/284 |
| 2011/0043178 | A1 * | 2/2011 | Cheng et al. | 323/283 |
| 2013/0027009 | A1 * | 1/2013 | Tang et al. | 323/271 |
| 2014/0043008 | A1 * | 2/2014 | Babazadeh et al. | 323/304 |

\* cited by examiner

*Primary Examiner* — Adolf Berhane
*Assistant Examiner* — Alex Torres-Rivera
(74) *Attorney, Agent, or Firm* — Fish & Richardson P.C.

(57) ABSTRACT

Methods and systems are disclosed for an integrated voltage regulator with open loop digital control for power stepping. In one aspect, a method for regulating an output voltage includes receiving data indicative of a power setting associated with an identified state of an electrical circuit, the power setting based on a load current demand of the electrical circuit in the identified state, enabling one or more parallel driver segments based on the received data indicative of the power setting. The method further includes sourcing by the enabled one or more parallel driver segments sufficient current to meet the load current demand of the electrical circuit in the identified state while maintaining the output voltage at a predetermined voltage level, and providing the output voltage to the electrical circuit at the predetermined voltage level.

20 Claims, 4 Drawing Sheets

---
FULLY INTEGRATED VOLTAGE REGULATOR USING OPEN LOOP DIGITAL CONTROL FOR OPTIMUM POWER STEPPING AND SLEW RATE

TECHNICAL FIELD

The subject matter of this application is generally related to voltage regulators.

BACKGROUND

In general, voltage regulators are designed to automatically maintain a constant regulated voltage level. A voltage regulator can include both analog and digital electronic components. The voltage regulator can control one or more alternating current (AC) or direct current (DC) voltages. The voltage regulator provides a regulated, stabilized output voltage level to components included in an electrical circuit independent of changes in the load current demand of the electrical circuit and the input voltage to the voltage regulator.

A voltage regulator can use a voltage-controlled current source to force a desired fixed voltage to appear at the output of the voltage regulator. Control circuitry included in the voltage regulator can monitor or sense the output voltage of the voltage regulator and adjust the voltage-controlled current source dependent on the load of the electrical circuit in order to hold the output voltage of the voltage regulator at the desired fixed voltage. A design limitation of the voltage-controlled current source can define the maximum load current the voltage regulator can source while still maintaining a regulated output voltage. Exceeding this design limitation may result in an unstable or out of regulation output voltage.

SUMMARY

In some implementations, an integrated voltage regulator can include an analog feedback loop that controls the output voltage of the voltage regulator providing stability to the output voltage when rapid changes in the load of the electrical circuit occur. The feedback loop can include a bypass capacitor and other analog circuitry that are used to stabilize the regulated output voltage when rapid changes in the load of the electrical circuit produce rapid changes in the demand for current draw from the voltage regulator.

A maximum slew rate specification for a voltage regulator specifies the maximum frequency or rate of change in the load of the electrical circuit at which the voltage regulator will respond and continue to maintain a regulated, stable output voltage. The voltage regulator requires a finite amount of time in order to correct, or maintain within a certain specified range, the regulated output voltage of the voltage regulator following a change in the load current of the electrical circuit. The analog feedback loop in the voltage regulator first senses the output voltage and, dependent on the output voltage value, the voltage regulator then corrects and stabilizes the regulated output voltage. The amount of time it takes the voltage regulator to correct and stabilize the regulated output voltage after a change in the load current of the electrical circuit can be referred to as the transient response of the voltage regulator.

In some implementations, the analog feedback loop of the voltage regulator can provide closed loop analog control of the output voltage level of the voltage regulator. The closed loop analog control senses the output voltage level of the voltage regulator and compares it to a reference voltage in order to hold the regulated output voltage at a fixed level independent of changes in the load current of the electrical circuit. The design of the closed loop analog control needs to provide compensation for rapid changes in load current demand by the electrical circuit. This may require the use of a large bypass capacitor external to the integrated voltage regulator and additional complex analog circuitry.

In some implementations, the rapid changes in load current can be characterized at the time of the design of the voltage regulator and the electrical circuit. A digital state machine can control one or more power settings for the voltage regulator based on the one or more respective characterized digital loads. The digital state machine can control the switching of multiple parallel driver segments included in the voltage regulator for each power setting. The voltage regulator can respond to the change in load current demand from the electrical circuit based on the current state of the electrical circuit. The voltage regulator can provide a regulated output voltage without implementing complicated and costly closed loop analog control for electrical circuits that exhibit rapid changes in load current demand. The digital state machine can control the application of the appropriate power setting for each identified condition of the electrical circuit. A simplified analog feedback control loop can accommodate any load changes of the electrical circuit within each power range.

In one implementation, a system and method are provided for regulating an output voltage. In general, in one aspect, a method for regulating an output voltage is provided. The method includes receiving data indicative of a power setting associated with an identified state of an electrical circuit, the power setting based on a load current demand of the electrical circuit in the identified state, enabling one or more parallel driver segments based on the received data indicative of the power setting, sourcing by the enabled one or more parallel driver segments sufficient current to meet the load current demand of the electrical circuit in the identified state while maintaining the output voltage at a predetermined voltage level, and providing the output voltage to the electrical circuit at the predetermined voltage level.

The method can include one or more of the following features. The state of the electrical circuit is identified based on an associated operating load condition of the electrical circuit. A load current demand for the identified state is characterized using a power simulation for the associated operating load condition of the electrical circuit. The method further includes configuring a voltage regulator to regulate the output voltage, and where the characterization of the load current demand for the identified state is performed prior to the configuring of the voltage regulator. Each of the one or more parallel driver segments comprises a multiplexer and a transistor. A size of the transistor is determined based on the characterized load current demand for the state. The one or more parallel driver segments provide digital open loop control of the output voltage. Analog closed loop control maintains the output voltage at the predetermined voltage level.

In general, in one aspect, a system for regulating an output voltage is provided. The system includes a digital state machine configured to identify one or more states of an electrical circuit included in the system, where each of the one or more identified states is associated with a respective power setting with a power range, the power setting based on a load current demand of the electrical circuit in the identified state, one or more parallel driver segments configured to source a sufficient amount of current in order to meet the load current demand of the electrical circuit in the identified state, and an amplifier configured to accommodate system load changes for each particular power range of the power setting associated with the identified state in order to maintain the output voltage at a predetermined voltage level for the identified state.

The system can include one or more of the following features. The one or more states of the electrical circuit are identified based on one or more respective operating load conditions of the electrical circuit. A load current demand for each of the one or more identified states is characterized using power simulations for each respective operating load condition of the electrical circuit. The system further includes a voltage regulator configured to regulate the output voltage, where the voltage regulator includes the one or more parallel driver segments and the amplifier, and the characterization of the load current demand for each of the one or more states is performed prior to configuring the voltage regulator. The one or more parallel driver segments provide digital open loop control of the output voltage. One segment of the one or more parallel driver segments comprises a multiplexer and a transistor. A size of the transistor is determined based on the characterized load current demand for the respective identified state. Analog closed loop control maintains the output voltage at the predetermined voltage level. The system further includes a resistor divider that samples the output voltage, and where maintaining the output voltage at a predetermined voltage level includes comparing, by the amplifier, the sampled output voltage to a reference voltage, and adjusting the output voltage based on the comparing, by the amplifier, of the sampled output voltage to the reference voltage.

Particular implementations of the subject matter described in this specification can be implemented so as to realize one or more of the following advantages. For example, the design of an integrated voltage regulator can be closely coupled to the load current demands of an electrical circuit that receives the regulated output voltage of the integrated voltage regulator. A digital state machine can activate digital loads that can be characterized and used to identify one or more power ranges for the voltage regulator. In addition, the digital state machine can control the addition or removal of parallel driver segments in the voltage regulator dependent on each predetermined power range. The power correction for the voltage regulator can be set within a particular power range by the digital state machine dependent on the state of the electrical circuit. The use of the digital state machine to switch control circuitry in the voltage regulator to accommodate for each predetermined power range eliminates the need for complicated and costly closed loop analog control circuitry. The closed loop analog circuitry no longer needs to sample the output of the voltage regulator to adjust and stabilize the regulated output voltage in response to rapid load current demands by the electrical circuit. It may only need to respond to smaller in-range variations. Simplified closed loop analog circuitry senses, corrects, and stabilizes the regulated output voltage of the voltage regulator for the load variations within each selected power range of the voltage regulator. Therefore, the demands placed on the closed loop analog circuitry are reduced.

In some implementations, the voltage regulator can include an internal bypass capacitor and an external bypass capacitor. The use of a digital state machine to switch control circuitry in the voltage regulator to accommodate for each predetermined power range can reduce the value of the total bypass capacitance needed by the voltage regulator. This can result in a reduction in the value, and subsequently the size, of the external capacitor. In some cases, the external capacitor can be eliminated. In addition, the value, and subsequently the size, of the internal capacitor may also be reduced. This results in a reduction in the cost of the circuitry needed for the voltage regulator and a reduction in the amount of circuit board area needed for the voltage regulator.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
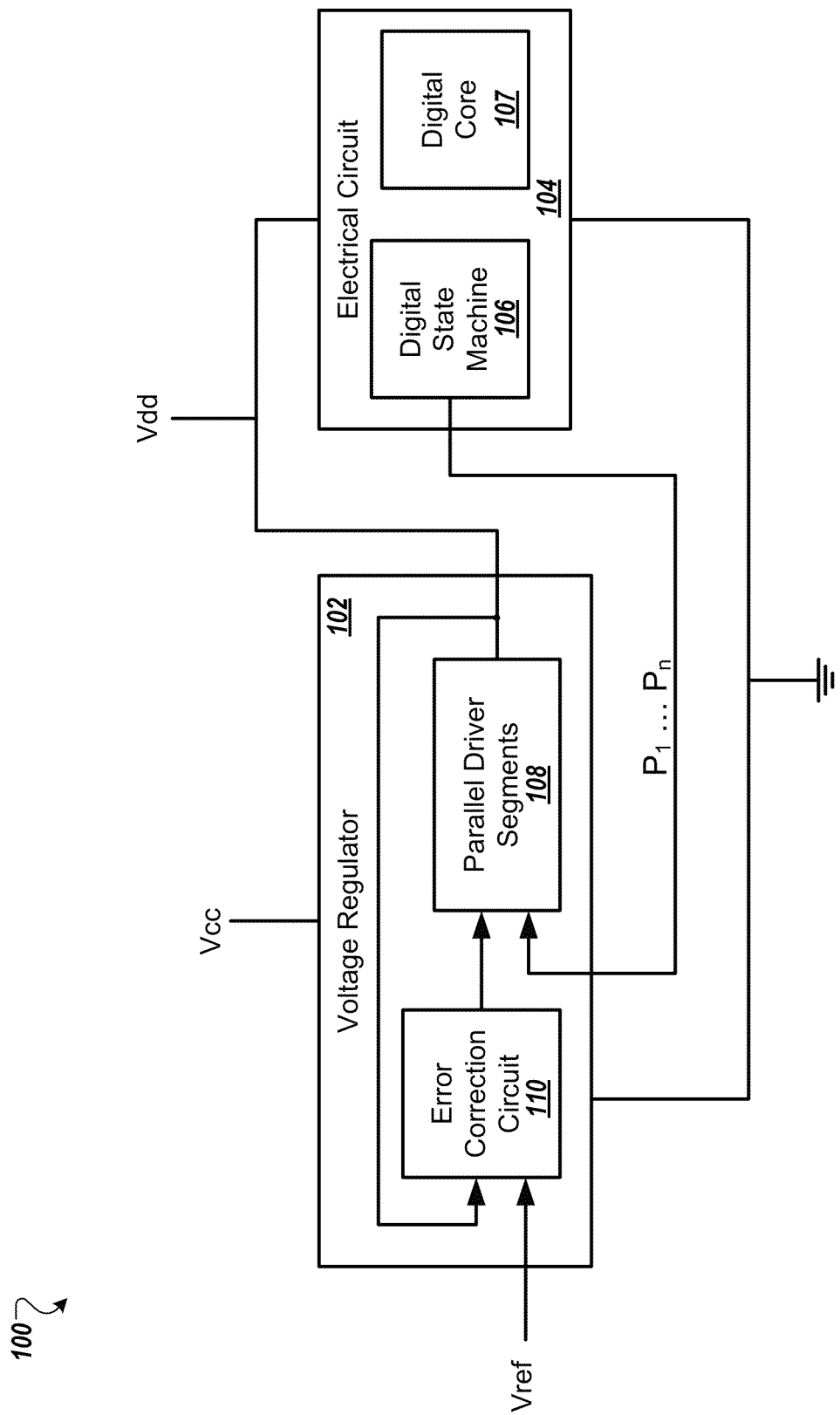
FIG. 1 is a block diagram of an example implementation of a system that includes an integrated voltage regulator with open loop digital control for power stepping.

Implementation of an Open Loop Digital Control for a Voltage Regulator

In some implementations, an electrical circuit can include multiple blocks of digital circuits each driven by a gated clock signal having a wide range of frequency domains. Such a circuit can have large current swings (e.g., 50:1) as the frequency of the clock signal can transition quickly from one frequency domain to another along with the number of digital circuits that are connected and operational at the time of the frequency change. The maximum slew rate specification for a voltage regulator for this type of electrical circuit would need to be specified so that the rapid change in current demand does not result in an unstable (e.g., oscillating) or out of range output voltage from the voltage regulator.

In some implementations, the voltage regulator includes a bypass capacitor and other additional circuitry (an analog error correction circuit) that provides frequency compensation and load buffering for the voltage regulator. This additional circuitry and bypass capacitor can provide compensation to an analog feedback loop for the voltage regulator in order to provide the needed stability to the output voltage level of the voltage regulator. In order to compensate for the large rapid load changes of the electrical circuit, a fully integrated voltage regulator would require placement of the bypass capacitor external to the integrated circuit. This is necessary because, in order to provide the needed buffering, the identified value of the capacitor would be too large for integration within the voltage regulator.

In some cases, a large external bypass capacitor may be needed in order to buffer large load current changes. The use of the large capacitor may result in a reduction in the response of the analog error correction circuit. For example, a voltage error over time until the analog error correction circuit responds is expressed by the equation: $\Delta V/\Delta t = I/C$, where V=voltage, t=time, I=current, and C=value of the external capacitor. A capacitor with a smaller value may require a faster, more complicated analog error correction circuit for a given voltage error ($\Delta V/\Delta t$).

The additional circuitry, the bypass capacitor, and the analog feedback loop provide closed loop analog control of the voltage regulator by sampling the load current and providing error correction in order to maintain the regulated, stable output voltage of the regulator. Ideally, the closed loop analog control continuously holds the regulated output voltage at a fixed value regardless of changes in the load current of the electrical circuit. However, a sudden or quick increase or decrease in load current demand on the voltage regulator can cause the regulated output voltage to change and become unstable until the closed loop analog control can provide the correction needed to stabilize the regulated output voltage. In addition, the ability of the closed loop analog control to provide the necessary corrections can be dependent on the frequency of the change in the load current and on the amount of change of the load current. A quick, large change in load current demand on the voltage regulator may cause greater fluctuations in the regulated voltage output and may require a longer amount of time to correct in contrast to a small, relatively slower change in the load current demand.

The additional circuitry can provide the error correction using methods that can include the use of pulse width modulation to control the regulated output voltage and analog-to-digital converters (ADCs) to help sense the change in the load of the electrical circuit and further control the regulated output voltage. The additional circuitry may be large and complex requiring the inclusion of additional components in the integrated voltage regulator, increasing the size (overall footprint) of the integrated voltage regulator and the overall power consumption of the integrated voltage regulator requiring the use of a larger and more expensive power supply for the integrated voltage regulator.

In some implementations of a system that includes a voltage regulator, a test procedure can simulate the use of an electrical circuit in order to characterize the load current demand under identified predetermined operating conditions for the electrical circuit. For example, power simulations can provide simulated load conditions for each of the identified operating conditions. The test procedure can measure the current demand for each identified operating condition under the simulated loads. The measured current demand can be used to characterize the load current demand on the voltage regulator when each of the identified operating conditions of the electrical circuit occur. As such, the system can characterize one or more digital loads for a predefined set of load conditions of the electrical circuit.

A power setting or range for the voltage regulator can be identified for each characterized digital load. In some implementations, a digital state machine provides control signals to the voltage regulator in order to control the switching of one or more parallel driver segments in the voltage regulator in order to compensate for the change in the load current demand on the voltage regulator. As such, the digital state machine can apply the appropriate power setting to the voltage regulator for each predefined operating condition or state of the electrical circuit. The voltage regulator can accommodate the load current demand changes within each power range.

Characterizing the load current demand on the voltage regulator for a set of predefined operating conditions of the electrical circuit and using a digital state machine to apply the appropriate power setting to the voltage regulator for each of the predefined operating conditions provides for open loop control of the voltage regulator in response to changes in current load demand. The use of open loop control of the voltage regulator in response to changes in load current demand can relax the requirements for additional circuitry for sensing the load changes and controlling of the regulated voltage output for the rapid, wide range of load current demands from the electrical circuit. In addition, the open loop control eliminates the need for a large external bypass capacitor.

The digital state machine sets the power range of the voltage regulator when the state of the electrical circuit indicates the need for a new power setting. Closed loop analog control of the voltage regulator can provide the error correction needed within the particular power range eliminating the need for complicated circuitry for error correction. The closed loop analog control of the voltage regulator operates within the load swings of the single power range and not over the entire power range of the voltage regulator. As such, the size of the bypass capacitor can be selected in order to be easily integrated into the voltage regulator. In addition, the design of the error amplifier need not compensate for a large maximum slew rate reducing its complexity.

Example Implementation of a System Including Open Loop Digital Control for a Voltage Regulator FIG. 1 is a block diagram of an example implementation of a system 100 that includes an integrated voltage regulator 102 with open loop digital control for power stepping. The system 100 includes an electrical circuit 104 that includes a digital state machine 106 and a digital core 107. The digital state machine 106 can identify a plurality of operating states of the digital core 107. For example, each operating state of the digital core 107 can represent a particular operating condition of the electrical circuit 104. Each operating condition can place a unique demand for power to be supplied from the voltage regulator 102 while the voltage regulator 102 maintains the regulated voltage, $V_{dd}$, to the electrical circuit at a particular voltage level. The demand for power can be based on the frequency of operation of the digital core as well as the number of digital circuits operational (e.g., connected) in the digital core for the identified operating state. In addition, the change in power demand may occur quickly as the digital core 107 may change rapidly from one operating state to another.

In order to adequately meet the digital core's 107 demand for power, the voltage regulator 102 provides the electrical circuit 104 with sufficient current in order to maintain the regulated voltage, $V_{dd}$, to the electrical circuit 104 at the particular voltage level. This is a result of the basic electrical equation, Power=I×V, where I=current and V=voltage. It follows that if the voltage, V, is to be maintained constant with changes in power demand from the electrical circuit 104, then the current, I, changes dependent on the power demand. As a result, the voltage regulator 102 provides the necessary current to the electrical circuit 104 in order to meet its power needs as well as maintaining the regulated voltage, $V_{dd}$, to the electrical circuit 104 at the particular voltage level.

In some implementations, a test procedure measures a load current demand at identified operating conditions or states of the electrical circuit 104 under simulated loads. The digital core 107 can be characterized as the load current demand of the electrical circuit 104 for each predetermined operating condition or state of the electrical circuit. The test procedure can maintain the regulated voltage, $V_{dd}$, to the electrical circuit 104 at a constant particular voltage level while simulating load conditions for the electrical circuit 104 at identified states of the electrical circuit 104. The test procedure can then measure the load current demand at each identified state.

For example, the test procedure can identify one or more operating states of the electrical circuit 104. The test procedure can identify a load current for each of the one or more operating states. As such, the test procedure characterizes a load current for each identified operating state of the electrical circuit 104. In some implementations, the system 100 can include a table stored in memory included in the system 100. The table can store for each identified operating state of the electrical circuit 104 the associated load current used by the electrical circuit 104 when the electrical circuit is operating in that identified state.

The digital state machine 106 can provide control signals indicative of the state ($P_1 \ldots P_n$, where n=number of states) of the electrical circuit 104 to parallel driver segments 108 included in the voltage regulator 102. For example, the digital state machine 106 identifies the operating state of the electrical circuit as "$P_1$". The digital state machine 106 provides the control signals to the parallel driver segments 108 for the state $P_1$. One or more parallel driver segments 108 can be enabled and/or disabled to provide the identified current drive capability to the voltage regulator 102 in order to meet the load current demand for the electrical circuit 104 during the "P1" state. This process can be repeated for the identified states of the electrical circuit 104 in no particular order.

Each identified state of the electrical circuit 104 can be considered a unique power setting for the voltage regulator 102. Specific parallel driver segments 108 can be enabled and/or disabled in order to implement each unique power setting for the voltage regulator 102 to accommodate for the load current demand on the voltage regulator 102 for the particular power setting.

In some implementations, each power setting can enable a single parallel driver segment, disabling the remaining parallel driver segments. In some implementations, each power setting can enable one or more parallel driver segments 108 while disabling one or more parallel driver segments 108. In some implementations, each parallel driver segment can source a different amount of additional current to the voltage regulator 102. In some implementations, each parallel driver segment can source the same amount of additional current to the voltage regulator 102. In both cases, each power setting can enable and/or disable one or more of the parallel driver segments 108 in order to provide the identified load current to the electrical circuit 104 for the identified power setting for the voltage regulator 102.

The voltage regulator 102 includes an error correction circuit 110. The error correction circuit 110 can provide correction and stabilization of the regulated voltage, $V_{dd}$, output from the voltage regulator 102 and input to the electrical circuit 104. The error correction circuit 110 can provide the correction and stabilization to the regulated voltage, $V_{dd}$, within each power setting or range of the voltage regulator 102. The error correction circuit 110 can compare the output voltage of the parallel driver segments 108 (the regulated voltage, $V_{dd}$, of the voltage regulator 102) to a reference voltage, $V_{ref}$. The reference voltage, $V_{ref}$, is equal to the particular voltage level desired for the regulated output voltage, $V_{dd}$, of the voltage regulator 102. The error correction circuit 110 can readjust the regulated voltage, $V_{dd}$, of the voltage regulator 102 in order for the regulated voltage, $V_{dd}$, to be at the desired particular voltage level.

Figure 2:
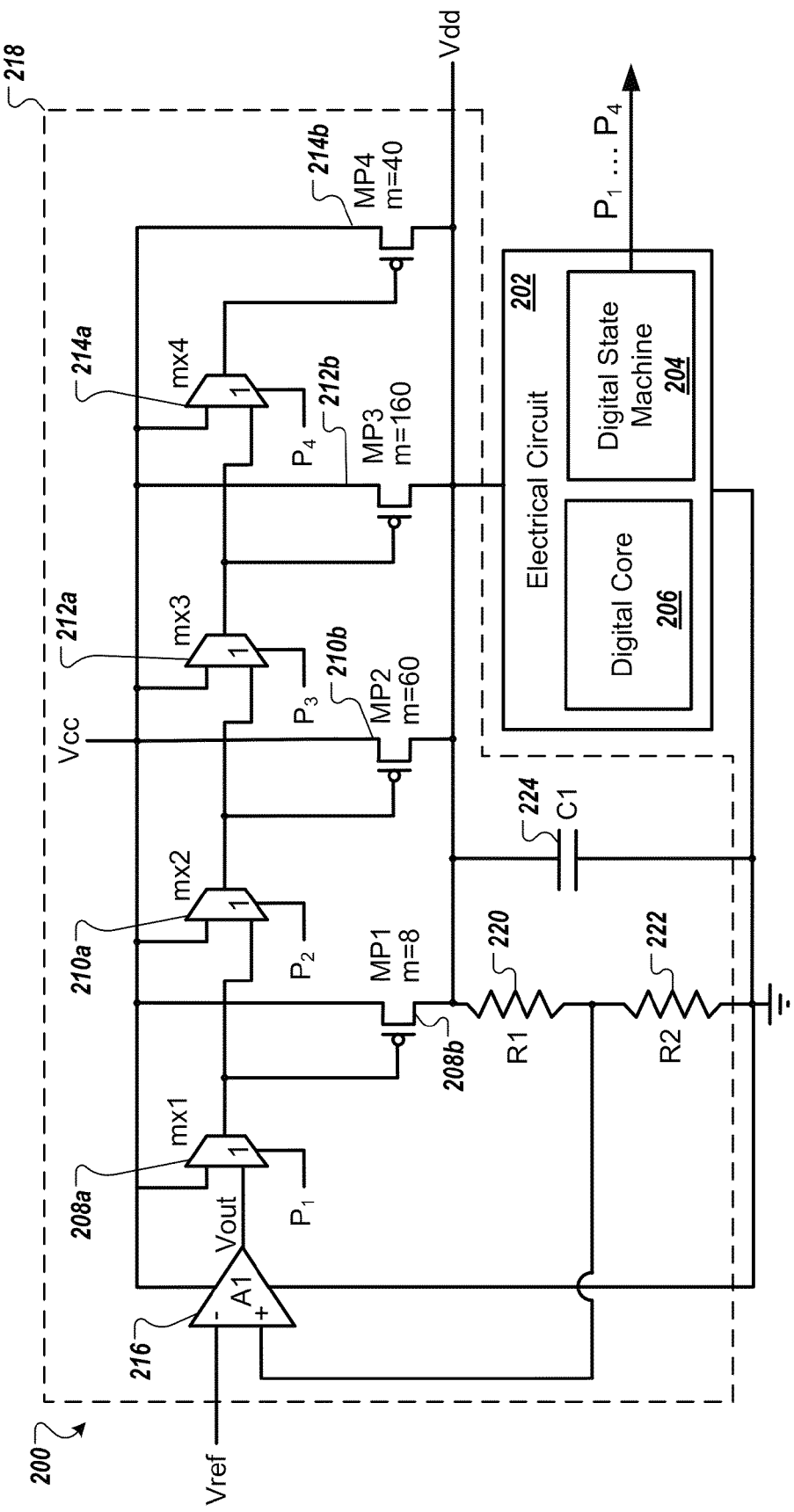
FIG. 2 is a block diagram of an example implementation of an integrated voltage regulator using open loop digital control for power stepping of four power settings.

Example Implementation of a System with an Integrated Voltage Regulator with Open Loop Digital Control for Power Stepping that Includes Four Power Settings FIG. 2 is a block diagram of an example implementation of a system 200 that includes an integrated voltage regulator 218 with open loop digital control for power stepping that includes four power settings. The system 200 includes an electrical circuit 202 that includes a digital core 206 and a digital state machine 204.

In the example system 200, four operating conditions or states are identified. In addition, the digital state machine 204 provides four control signals, $P_1$, $P_2$, $P_3$, and $P_4$, for controlling parallel driver segments in the voltage regulator 218. For example, the system 200 can be included in a microcontroller where the digital core 206 performs cryptographic operations. A first state can be a default or steady-state low power mode for the device. A second state can be for cryptographic operations performed by the device that do not include any multiplicative operations. A third state can be for cryptographic operations performed by the device that include multiplicative operations performed with the use of a multiplier. A fourth state can be for cryptographic operations performed by the device that include multiplicative operations performed with the use of a multiplier at a clock rate greater that the clock rate used in the third state.

A test procedure simulates the load current demand at each of the four identified operating conditions (states) of the electrical circuit 202. In some implementations, the test procedure can additionally measure the load current demand at each of the four identified operating conditions (states) of the electrical circuit 202 under the necessary load conditions. In the example system 200, the load current demand increases for each consecutive state (i.e., the load current demand for the fourth state is greater than the load current demand for the third state which is greater than the load current demand for the second state which is greater than the load current demand for the first state). In some implementations, the test procedure can simulate the load current demand before fabrication of the electrical circuit 202. The digital state machine 204 can then be programmed into the electrical circuit 202 during the fabrication of the electrical circuit 202. In some implementations, the test procedure can simulate the load current demand before or after fabrication of the electrical circuit 202. The digital state machine can then be programmed into the electrical circuit 202 after the fabrication of the electrical circuit 202.

The digital state machine 204 provides control signals ($P_1 \ldots P_4$) to parallel driver segments. In the example system 200, the control signals enable and/or disable parallel driver segments in the voltage regulator 218 dependent on the state of the electrical circuit 202. In the example system 200, each parallel driver segment includes a multiplexer and a drive transistor. In the first state, control signal $P_1$ is set equal to "1" and the remaining control signals, $P_2$, $P_3$, and $P_4$ are set equal to "0". The control signal $P_1$ provides an enabling signal to multiplexer 208a. The multiplexer 208a provides an output voltage $V_{out}$ of amplifier 216 to the gate of transistor 208b, enabling a parallel driver segment that includes transistor 208b. Transistor 208b is sized accordingly in order to provide the necessary source current to the voltage regulator 218 demanded by the first state of the electrical circuit 202.

In the second state, control signals $P_1$ and $P_2$ are set equal to "1" and the remaining control signals, $P_3$, and $P_4$ are set equal to "0". The control signal $P_1$ provides the enabling signal to multiplexer 208a. The multiplexer 208a provides the output voltage $V_{out}$ of amplifier 216 to the gate of transistor 208b. The control signal $P_2$ provides an enabling signal to multiplexer 210a. The multiplexer 210a provides the output voltage $V_{out}$ of amplifier 216 to the gate of transistor 210b enabling parallel driver segments that include transistor 208b and transistor 210b. Transistor 210b is sized accordingly that, when the source current provided by transistor 210b is combined with the source current provided by transistor 208b, the necessary source current demanded by the second state of the electrical circuit 202 is provided to the voltage regulator 218.

In the third state, control signals $P_1$, $P_2$, and $P_3$ are set equal to "1" and the remaining control signal $P_4$ is set equal to "0". The control signal $P_1$ provides the enabling signal to multiplexer 208a. The multiplexer 208a provides the output voltage $V_{out}$ of amplifier 216 to the gate of transistor 208b. The control signal $P_2$ provides the enabling signal to multiplexer 210a. The multiplexer 210a provides the output voltage $V_{out}$ of amplifier 216 to the gate of transistor 210b. The control signal $P_3$ provides an enabling signal to multiplexer 212a. The multiplexer 212a provides the output voltage $V_{out}$ of amplifier 216 to the gate of transistor 212b enabling parallel driver segments that include transistors 208b, 210b, and 212b. Transistor 212b is sized accordingly that, when the source current provided by transistor 212b is combined with the source current provided by transistor 208b and transistor 210b, the necessary source current demanded by the third state of the electrical circuit 202 is provided to the voltage regulator 218.

In the fourth state, control signals $P_1$, $P_2$, $P_3$, and $P_4$ are set equal to "1". The control signal $P_1$ provides the enabling signal to multiplexer 208a. The multiplexer 208a provides the output voltage $V_{out}$ of amplifier 216 to the gate of transistor 208b. The control signal $P_2$ provides the enabling signal to multiplexer 210a. The multiplexer 210a provides the output voltage $V_{out}$ of amplifier 216 to the gate of transistor 210b. The control signal $P_3$ provides the enabling signal to multiplexer 212a. The multiplexer 212a provides the output voltage $V_{out}$ of amplifier 216 to the gate of transistor 212b. The control signal $P_4$ provides an enabling signal to multiplexer 214a. The multiplexer 214a provides the output voltage $V_{out}$ of amplifier 216 to the gate of transistor 214b enabling parallel driver segments that include transistors 208b, 210b, 212b, and 214b. Transistor 214b is sized accordingly that, when the source current provided by transistor 214b is combined with the source current provided by transistor 208b, transistor 210b, and transistor 212b the necessary source current demanded by the fourth state of the electrical circuit 202 is provided to the voltage regulator 218.

In the example system 200, the gain of transistor 208b is set gated on the characterized load current demand of the electrical circuit 202 when the electrical circuit 202 is operating in a first state. The gain of transistor 210b is set based on the characterized load current demand for the second state that is in addition to the characterized load current demand for the first state. The gain of transistor 212b is set based on the characterized load current demand for the third state that is in addition to the combined characterized load current demand for the first state and the second state. The gain of transistor 214b is set based on the characterized load current demand for the fourth state that is in addition to the combined characterized load current demand for the first, second and third states.

As shown in the example system 200, the parallel driver segments provide incremental additional source current for the voltage regulator 218 as the electrical circuit 202 changes states from a first state to a fourth state. In some cases, the electrical circuit can change states sequentially from the first state to the fourth state. In some cases, the four states can occur in any order (e.g., the first state is followed by the fourth state, then the second state, and then the third state).

In the example system 200, additional parallel driver segments are enabled in order to meet the load current demand for the electrical circuit 202 for the identified states of the electrical circuit 202. In some implementations, a single parallel driver segment can be enabled for each state of the electrical circuit 202, where the remaining additional parallel driver segments are disabled. In this case, the gain of the transistor included in the enabled parallel driver segment is set based on the characterized load current demand for its associated state.

In some implementations, the gain for each transistor included in the parallel driver segments can be the same. The load current demand for a particular state of the electrical circuit 202 can be met by enabling the number of parallel driver segments needed to meet the characterized load current demand for the particular state. In some implementations, a binary weighted stack can be used when implementing the gain for each transistor included in the parallel driver segments. For example, a first transistor can have a gain of "x", a second transistor can have a gain of "2x", a third transistor can have a gain of "4x", and a fourth transistor can have a gain of "8x". In this case, the parallel driver segments can be enabled and/or disabled individually or multiple parallel driver segments can be enabled in order to meet the characterized load current demand for a particular state of the electrical circuit 202.

The various implementations described are not limited to a particular number of parallel driver segments. For example, the number of parallel driver segments can be determined based on the number of identified and characterized states of the electrical circuit 202. In another example, the number of parallel driver segments can be determined based on the precision needed for the source current provided by the parallel driver segments in the voltage regulator 218. As such, the example system 200 shows four power settings for the voltage regulator 218, however, other implementations can include more or fewer power settings.

In the example system 200, amplifier 216 provides error correction in the voltage regulator 218. An error correction circuit can include the amplifier 216, resistors 220, 222 and capacitor 224. The error correction circuit can provide correction and stabilization to the regulated voltage, $V_{dd}$, within each power setting or range of the voltage regulator 218. The output voltage, $V_{out}$, from the amplifier 216 is selectively applied to transistors 208b, 210b, 212b, and 214b dependent on the state of the electrical circuit 202 and the associated load current demand. Selectively applying the output voltage, $V_{out}$, from the amplifier 216 to the gate of any or all of the transistors 208b, 210b, 212b, and 214b results in current flow from the unregulated power supply, $V_{cc}$, into resistors 220 and 222, capacitor 224, and the electrical circuit 202. The amount of current flow is dependent on the overall gain provided by the selectively enabled transistors. As described, the gain of the transistors and the determination as to which transistors are enabled is based on the associated characterized load current demand for the state of the electrical circuit 202 for the current power setting of the voltage regulator 218.

The resistors 220 and 222 form a resistor divider that samples the regulated voltage, $V_{dd}$, which is also applied to an input of the amplifier 216 essentially forming a closed loop analog regulator. The amplifier 216 continuously adjusts its output voltage, $V_{out}$, which results in the adjustment of the current into the gate of each selectively enabled transistor 208b, 210b, 212b, and 214b in order to produce currents to force the voltages at the inputs to the voltage regulator 218 to be equal.

Characterizing the load current demand for the electrical circuit 202 based on a state of the electrical circuit 202 along with the use of parallel driver segments to meet the load current demand for the electrical circuit 202 when the electrical circuit is operating during the state, allows for a reduction in the transient response of the error correction circuit. The transient response of the error correction circuit can be based on the values selected for the resistors 220 and 222, the capacitor 224 and the transconductance of each of the stages of the amplifier 216. The improved transient response of the error correction circuit can allow for the selection of a small capacitor for the capacitor 224 which can be easily integrated with the voltage regulator 218.

As described above with reference to FIG. 1, a voltage error over time, or transient voltage error, is expressed by the equation: $\Delta V/\Delta t = I/C$, where V=voltage, t=time, I=load current, and C=value of the bypass capacitor. The use of a large bypass capacitor (a large value for the capacitor, C) can result in smaller voltage errors ($\Delta V$) based on the dynamic bypass load current changes (changes in the load current, I). However, as a large bypass capacitor may not be easily integrated with the voltage regulator, the need may arise for a faster change in the voltage error over time or a faster transient voltage error response ($\Delta V/\Delta t$). For example, the use of open loop control of the voltage regulator 218 can achieve the faster transient voltage error response by increasing the voltage regulator source current digitally, while maintaining an analog control loop output voltage ($V_{out}$ of amplifier 216) constant.

The error correction circuit that includes the amplifier 216, resistors 220, 222 and capacitor 224 is reduced to an implementation of a standard analog voltage regulator when the multiplexers 208a, 210a, 212a, and 214a are in a pass-through state. In this state, the transistors 208b, 210b, 212b, and 214b are all enabled and resistor R1 and capacitor 224 would effectively be connected to the unregulated power supply voltage, $V_{cc}$. Under these conditions, the standard analog voltage regulator alone would need to respond to large, rapid changes in load current demand significantly increasing the transient response of the analog voltage regulator. While responding and adjusting to the large, rapid changes in load current demand, the regulated voltage, $V_{dd}$, of the analog voltage regulator can vary until the loop can correct and stabilize the regulated output voltage, $V_{dd}$, in response to the new load current demand. The allowed amount of variation of the regulated output voltage, $V_{dd}$, can be controlled by the selection of the value for the capacitor 224. Keeping the output variation of the regulated voltage, $V_{dd}$, within a range that will not cause damage to the electrical circuit 202 and that will allow the electrical circuit 202 to remain functional can require a large transient response for the standard analog voltage regulator requiring the selection of a large value for the capacitor. The large capacitor may not be integrated with the voltage regulator due to its size and may be placed external to the integrated voltage regulator.

Simulated Test Results

Figure 3:
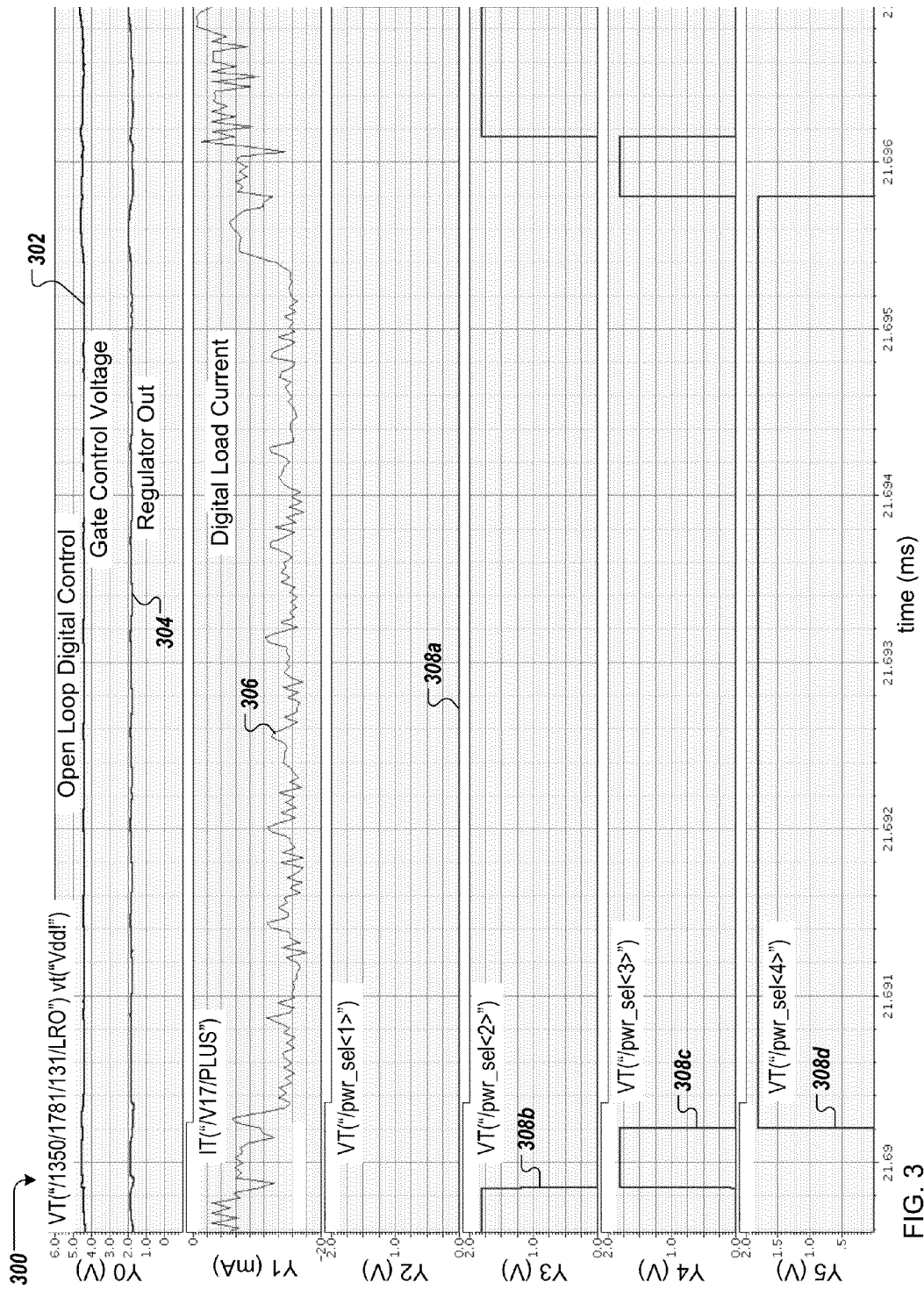
FIG. 3 is a chart of simulated results from an integrated voltage regulator using open loop digital control for power stepping.

FIG. 3 is a chart 300 of simulated results from an integrated voltage regulator using open loop digital control for power stepping. As shown in FIG. 3, a gate control voltage 302 remains constant. Referring to FIG. 2, the gate control voltage 302 can be representative of the output voltage $V_{out}$ of amplifier 216 that is applied to the gates of transistors 208b, 210b, 212b, and 214b when each transistor is selectively enabled. A regulator out voltage 304 is the desired regulated voltage, $V_{dd}$, of the integrated voltage regulator (e.g., the voltage regulator 218) which also remains constant.

In the simulated results shown in FIG. 3, a digital load current 306 varies from 0.5 milliamps (mA) to 18 mA. The digital load current 306 can be representative of the load current demand of the electrical circuit 202 over time as the electrical circuit 202 operates in different states. Each of four power settings for the voltage regulator, shown by curves 308a-d, are associated with a particular control signal for the parallel driver segments. For example, referring to FIG. 2, the equations below show the relationship between the four power settings (pwr_sel<1> or pwr_sel<2> or pwr_sel<3> or pwr_sel<4>) for the voltage regulator 218 and the four control signals, $P_1$, $P_2$, $P_3$, and $P_4$, for controlling the parallel driver segments in the voltage regulator 218.

$P_1$=(pwr_sel<1>)
$P_2$=(pwr_sel<1> AND pwr_sel<2>)
$P_3$=(pwr_sel<1> AND pwr_sel<2> AND pwr_sel<3>)
$P_4$=(pwr_sel<1> AND pwr_sel<2> AND pwr_sel<3> AND pwr_sel<4>)

Each power setting can be associated with a particular operating state of the electrical circuit 202 where the power setting is enabled in order to respond to the load current demands of the electrical circuit 202 over time as shown by the digital load current 306.

The chart 300 shows the value of the gate control voltage 302 remains constant as the digital load current 306 varies 36:1 over several microseconds. This is due to the selective enabling of the power settings in the voltage regulator based on the load current demand over time as shown by the curves 308a-d. In contrast, a standard analog voltage regulator, without the use of parallel driver segments, would require a full scale swing (e.g., about 4V) of the gate control voltage in order to respond to the 36:1 variation in the digital load current 306 over the several microsecond time period. In addition, the standard analog voltage regulator would include closed loop analog control of the output voltage level of the voltage regulator (e.g., regulator out 304). In order to maintain the regulated output voltage at a constant level, a conversion delay would be associated with the load change that would require additional circuitry (e.g., a large external capacitor).

Figure 4:
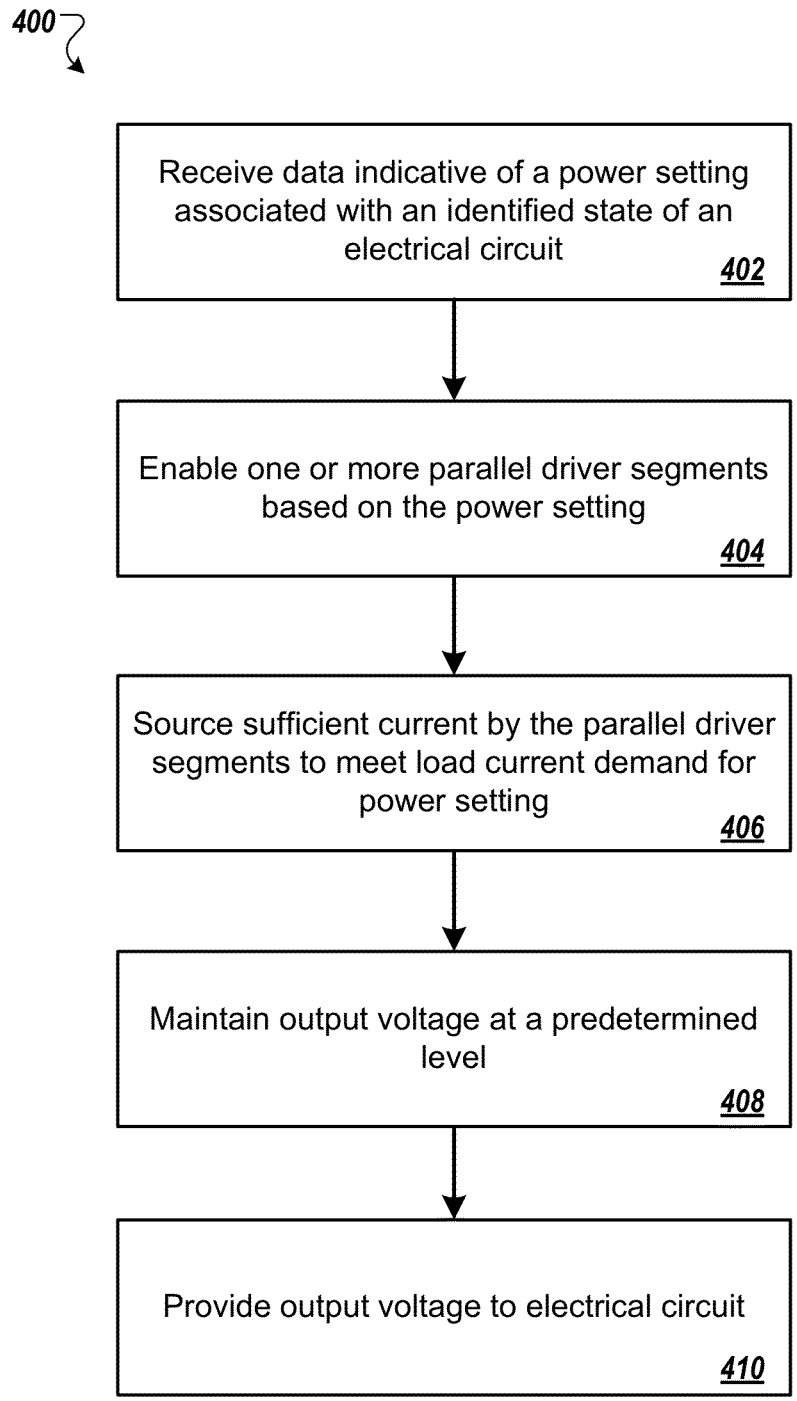
FIG. 4 is a flow diagram of an example implementation of a voltage regulation process in an integrated circuit.

Flow Diagram of Example Implementation of a Voltage Regulation Process Responsive to Load Current Demand Changes FIG. 4 is a flow diagram of an example implementation of a voltage regulation process 400 in an integrated circuit. The process 400 begins by receiving data indicative of a power setting for a voltage regulator where the power setting is associated with an identified state of an electrical circuit (step 402). For example, as shown in FIG. 1, the parallel driver segments 108 included in the voltage regulator 102 receive control signals indicative of the state ($P_1 \ldots P_n$, where n=number of states) of the electrical circuit 104. The power setting is based on the load current demand of the electrical circuit in the identified state.

One or more parallel driver segments are enabled based on the received data indicative of the power setting (step 404). For example, one or more parallel driver segments 108 can be enabled for the power setting for the voltage regulator 102. Sufficient current is sourced by the enabled one or more parallel driver segments in order to meet the load current demand (step 406). The sourced current meets the load current demand of the electrical circuit in the identified state. The regulated output voltage is maintained at a predetermined voltage level (step 408). The output voltage is provided to the electrical circuit at the predetermined voltage level (step 410). For example, the voltage regulator 102 maintains the regulated voltage, $V_{dd}$, to the electrical circuit 104 at a particular voltage level while providing the load current demanded by the electrical circuit 104.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A method for regulating an output voltage, the method comprising:
   receiving, from a digital state machine, a digital power setting control signal based on an identified state of an electrical circuit comprising a digital core, the identified state representing a predefined operating condition of the electrical circuit, the digital power setting control signal being generated based on a digital logic state of the digital core, the digital logic state indicating a load current demand of the electrical circuit in the identified state in order to maintain the output voltage to the electrical circuit at a predetermined voltage level;
   enabling one or more parallel driver segments based on the digital power setting control signal;
   sourcing by the enabled one or more parallel driver segments current to meet the load current demand of the electrical circuit in the identified state while maintaining the output voltage at the predetermined voltage level; and
   providing the output voltage to the electrical circuit at the predetermined voltage level.

2. The method of claim 1, wherein the identified state of the electrical circuit is identified based on an associated operating load condition of the electrical circuit.

3. The method of claim 2, wherein a load current demand for the identified state is characterized using a power simulation for the associated operating load condition of the electrical circuit.

4. The method of claim 3, further comprising configuring a voltage regulator to regulate the output voltage; and wherein the characterization of the load current demand for the identified state is performed prior to the configuring of the voltage regulator.

5. The method of claim 4, wherein each of the one or more parallel driver segments comprises a multiplexer and a transistor.

6. The method of claim 5, wherein a size of the transistor is determined based on the characterized load current demand for the state.

7. The method of claim 1, wherein the one or more parallel driver segments provide digital open loop control of the output voltage.

8. The method of claim 7, wherein analog closed loop control maintains the output voltage at the predetermined voltage level.

9. The method of claim 1, wherein the load current demand is at least partially based on a frequency of operation of the digital core.

10. The method of claim 1, wherein the digital logic state of the digital core includes one of multiple states for cryptographic operations performed by the digital core, and wherein the multiple states include at least one of:
   a first state being a steady-state low power mode for the digital core,
   a second state being for cryptographic operations that do not include any multiplicative operations,
   a third state being for cryptographic operations that include multiplicative operations performed with a use of a first multiplier, or
   a fourth state being for cryptographic operations that include multiplicative operations performed with a use of a second multiplier at a clock rate greater than a clock rate used in the third state.

11. A system comprising:
   an electrical circuit comprising a digital core;
   a digital state machine configured to identify one or more states of the electrical circuit, wherein each of the one or more identified states is based on a respective power setting, the power setting based on a digital logic state indicating a load current demand of the digital core of the electrical circuit in the identified state in order to maintain an output voltage to the electrical circuit at a predetermined voltage level, the identified state representing a predefined operating condition of the electrical circuit;
   one or more parallel driver segments configured to source current in order to meet the load current demand of the electrical circuit in a corresponding identified state of the one or more identified states; and
   an amplifier configured to accommodate system load changes for a power range of the power setting associated with the identified state in order to maintain the output voltage at the predetermined voltage level for the identified state.

12. The system of claim 11, wherein the one or more states of the electrical circuit are identified based on one or more respective operating load conditions of the electrical circuit.

13. The system of claim 12, wherein a load current demand for each of the one or more identified states is characterized using power simulations for each respective operating load condition of the electrical circuit.

14. The system of claim 13, further comprising:
   a voltage regulator configured to regulate the output voltage, wherein:
      the voltage regulator includes the one or more parallel driver segments and the amplifier; and
      the characterization of the load current demand for each of the one or more identified states is performed prior to configuring the voltage regulator.

15. The system of claim 11, wherein the one or more parallel driver segments provide digital open loop control of the output voltage.

16. The system of claim 15, wherein one of the one or more parallel driver segments comprises a multiplexer and a transistor.

17. The system of claim 16, wherein a size of the transistor is determined based on the characterized load current demand for a respective identified state.

18. The system of claim 15, wherein analog closed loop control maintains the output voltage at the predetermined voltage level.

19. The system of claim 18, further comprising:
   a resistor divider that samples the output voltage; and
   wherein maintaining the output voltage at the predetermined voltage level comprises:
      comparing, by the amplifier, the sampled output voltage to a reference voltage; and adjusting the output voltage based on the comparing, by the amplifier, of the sampled output voltage to the reference voltage.

20. The system of claim 11, wherein the digital logic state includes one of multiple states for cryptographic operations performed by the digital core, and
   wherein the multiple states include at least one of:
      a first state being a steady-state low power mode for the digital core,
      a second state being for cryptographic operations that do not include any multiplicative operations,
      a third state being for cryptographic operations that include multiplicative operations performed with a use of a first multiplier, or
      a fourth state being for cryptographic operations that include multiplicative operations performed with a use of a second multiplier at a clock rate greater than a clock rate used in the third state.

* * * * *